(No Model.)

M. McRAE.
BOX COVER.

No. 580,193. Patented Apr. 6, 1897.

Witnesses
Henry F. Hills.
K. A. Nau.

Inventor
Mary McRae
By John Wedderburn
her Attorney

THE NORRIS PETERS CO., PHOTO-LITHO., WASHINGTON, D. C.

United States Patent Office.

MARY McRAE, OF EVERETT, WASHINGTON.

BOX-COVER.

SPECIFICATION forming part of Letters Patent No. 580,193, dated April 6, 1897.

Application filed April 22, 1896. Serial No. 588,588. (No model.)

*To all whom it may concern:*

Be it known that I, MARY MCRAE, a citizen of the United States, residing at Everett, in the county of Snohomish and State of Washington, have invented certain new and useful Improvements in Box-Covers; and I do hereby declare the following to be a full, clear, and exact description of the invention, such as will enable others skilled in the art to which it appertains to make and use the same.

This invention relates to certain new and useful improvements in boxes; and it has for its object, among others, to provide a box with a cover so arranged that the cover will slide back and down over the end of the box, thus holding it open and also greatly simplifying the replacing of the cover.

I have noticed the trouble and confusion in stores in opening boxes and misplacing covers, and to them the advantages of a box provided with my improvement will be appreciated.

The device which forms the subject-matter of this invention serves also to secure the cover to the box when closed.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1:
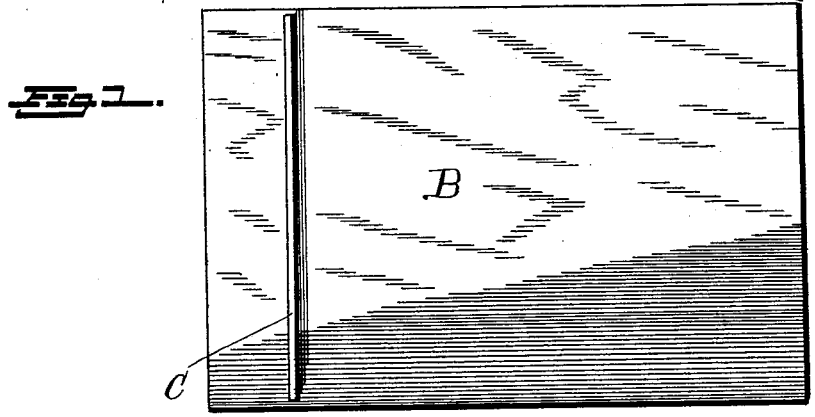
Figure 2:
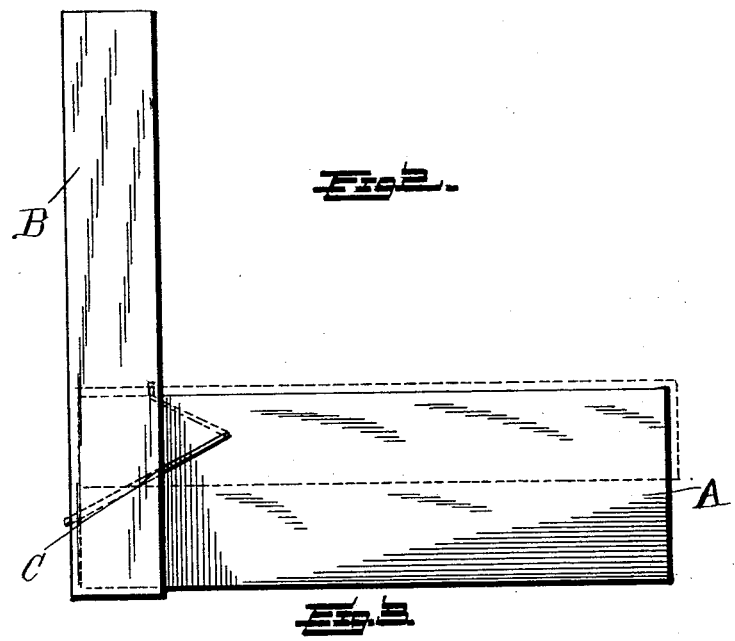
Figure 3:
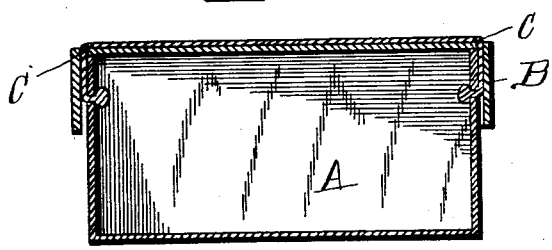

Figure 1 is a view of a box with the cover closed and provided with my improvement. Fig. 2 shows the box with the cover open. Fig. 3 is a section showing the connection of the elastic band with the cover.

Like letters of reference indicate like parts throughout the several views.

Referring now to the details of the drawings by letter, A designates the box, and B the cover. These are of usual or well-known construction.

My improvement consists of an elastic connection between the box and cover, and in this instance is shown as a cord or band C of elastic, having its ends secured within the box near one end thereof and passed through the cover at opposite edges and across the upper face of the said cover, as shown.

In practice when the cover is on the box the band serves to hold the same down, but when it is desired to open the box the cover is slid back and down over the end of the box, thus holding it open, as seen in Fig. 2, the cover standing on end at the end of the box. The replacing of the cover is also greatly simplified, as all that is necessary to do is to release the end of the cover from the bottom of the box, when it will go back into place.

The invention may be applied to round boxes as well by fastening the rubber to the box where the lower edge of the cover comes and fastened on the top edge of the cover in a direct line across the center, or it may be fastened lower down on the box, so that when the cover is removed it will remain against the side, leaving the opening entirely free, or the cover may be brought round and placed under the box.

What is claimed as new is—

The combination with a box and its cover, of an elastic cord having its ends secured to the opposite sides of the box and passed through the cover near opposite edges and across the upper face of said cover and between the flanges of the latter and the sides of the box, substantially as shown and described.

In testimony whereof I have signed this specification in the presence of two subscribing witnesses.

MARY McRAE.

Witnesses:
J. H. RUFRED,
ADELBERT FOLSOM.